United States Patent [19]
Boike et al.

[11] Patent Number: 5,477,745
[45] Date of Patent: Dec. 26, 1995

[54] COMPACT CORE ADJUSTMENT MECHANISM

[75] Inventors: Randy J. Boike, Clarkston; Daniel F. Chegash, Roseville, both of Mich.

[73] Assignee: Teleflex Incorporated, Troy, Mich.

[21] Appl. No.: 303,394

[22] Filed: Sep. 9, 1994

[51] Int. Cl.⁶ .................................................... F16C 1/22
[52] U.S. Cl. ............................................................ 74/502.6
[58] Field of Search ................................ 74/502.6, 502.4

[56] References Cited

U.S. PATENT DOCUMENTS

| | | |
|---|---|---|
| 3,572,159 | 6/1969 | Tschanz . |
| 4,854,186 | 8/1989 | Jakob et al. . |
| 5,161,428 | 11/1992 | Petruccello ............................ 74/502.4 |
| 5,295,408 | 3/1994 | Nagle et al. ............................ 74/502.6 |
| 5,394,770 | 3/1995 | Boike et al. ........................ 74/502.6 X |

*Primary Examiner*—Rodney H. Bonck
*Assistant Examiner*—Mary Ann Battista
*Attorney, Agent, or Firm*—Howard & Howard

[57] ABSTRACT

A motion transmitting remote control cable assembly (10) comprises a core adjustment mechanism (16, 18, 20) disposed on one end of a core element (12) for adjusting the length of the core element. The core adjustment mechanism comprises a slider member (16) attached to the end of the core element (12) and a housing (18) for slidably supporting the slider member as the slider reciprocates within the housing in response to movement of the core element. The core adjustment mechanism also includes a lock mechanism (20) disposed on the housing for locking the slider member (16) in a given position with respect to the housing (18). A spring (22) is disposed within a partially enclosed space (17) in the slider member (16). The assembly (10) is characterized by a spring tab (24) extending from the housing (18) into the space (17) defined by the slider member (16) to abut one end of the spring (22) so that the slider member telescopes over the spring tab as the spring reacts between the slider member and the spring tab.

18 Claims, 2 Drawing Sheets

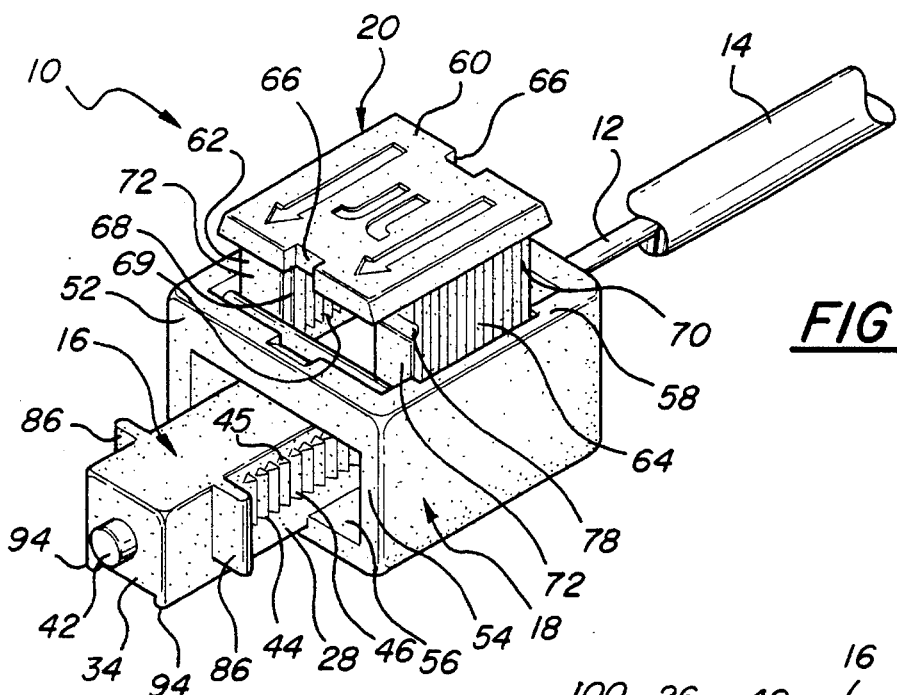
*FIG-1*
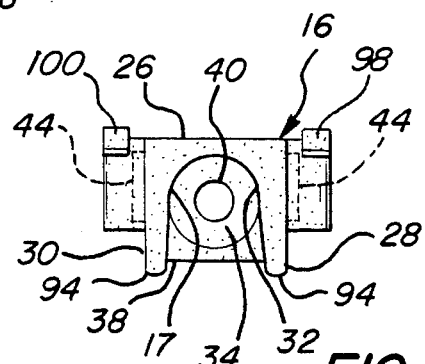
*FIG-9*
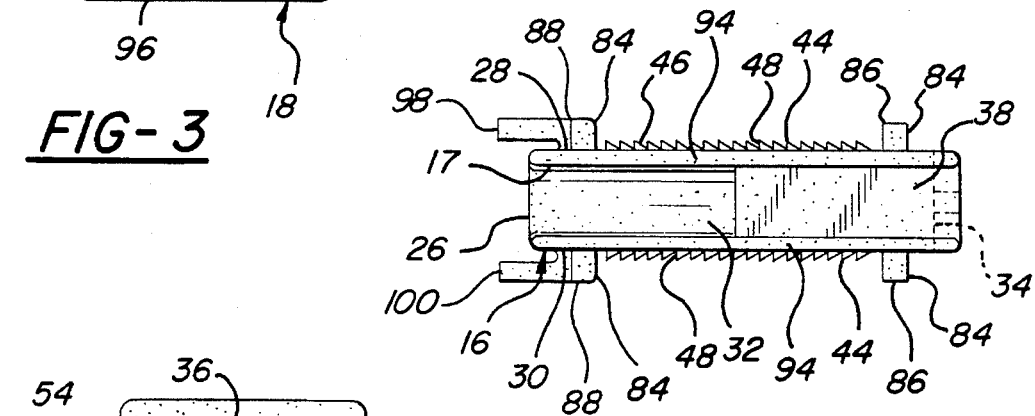
*FIG-4*
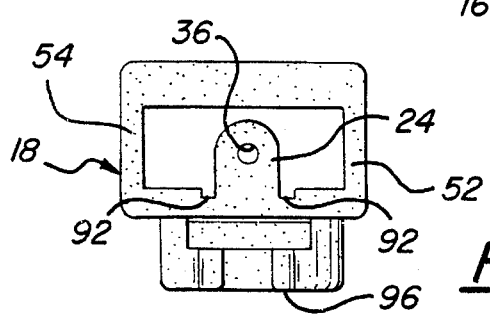
*FIG-3*
*FIG-5*

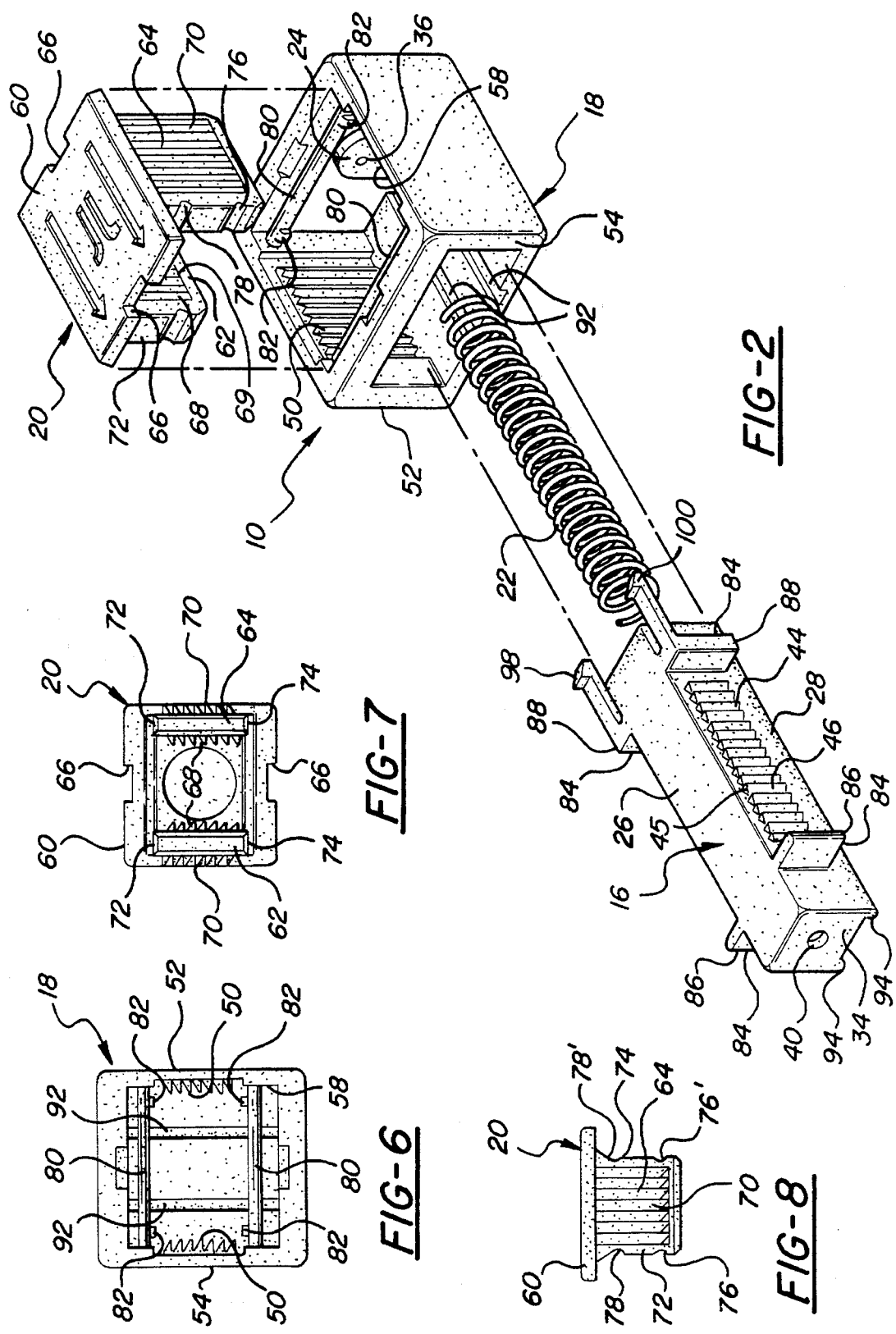

5,477,745

COMPACT CORE ADJUSTMENT MECHANISM

TECHNICAL FIELD

The subject invention relates to motion transmitting remote control cable assemblies of the type for transmitting motion in a curved path, and more particularly to such assemblies which include adjustment mechanisms for adjusting the relative length of the motion transmitting cable.

BACKGROUND OF THE INVENTION

Core adjustment mechanisms for adjusting the length of a motion transmitting core element or conduit are well-known in the remote control art. The typical assembly, as illustrated in U.S. Pat. No. 3,572,159 to Tschanz, includes a slider member slideably supported in a housing with a spring interposed between the slider and the housing to bias the slider in one direction with respect to the housing in order to take up slack in the core element or the conduit, whichever attaches to the slider. A locking member on the housing can lock the slider in a given position with respect to the housing, if desired.

In some core adjust mechanisms the slider and the housing enclose the spring. Such an arrangement is taught in U.S. Pat. No. 4,854,186 to Jakob et al. Enclosing the spring protects the spring from the environment and, at the same time, makes the overall core adjust package more compact. However, the design in the Jakob patent is by no means the most efficient, i.e. compact design for such core adjustment mechanisms.

SUMMARY OF THE INVENTION AND ADVANTAGES

A motion transmitting remote control cable assembly for transmitting motion in a curved path comprises a flexible motion transmitting core element and a conduit slideably supporting the core element. A slider member attaches to one end of the core element and defines a space surrounding the core element with a closed end and an open end. A housing slideably supports the slider member for reciprocating movement relative to the housing. Locking means is supported by the housing for moving between an unlocked position in which the slider member may reciprocate freely within the housing and a locked position in which the slider member is prevented from reciprocating relative to the housing. A spring having first and second ends is disposed in the space within the slider member to react with the closed end. The assembly is characterized by a spring tab extending from the housing and into the space and abutting the second end of the spring so that the slider member telescopes over the spring tab as the spring reacts between the closed end of the slider member and the spring tab.

By having a tab extend from the body of the housing into the partially enclosed space of the slider member and abut the spring which is disposed in the space, one can make a very efficient, very compact core adjustment mechanism if the operating environment so dictates.

FIGURES IN THE DRAWINGS

Other advantages of the present invention will be readily appreciated as the same becomes better understood by reference to the following detailed description when considered in connection with the accompanying drawings wherein:

FIG. 1 is perspective view of the assembly with the adjustment mechanism in the unlocked position;

FIG. 2 is an exploded view of the adjustment mechanism;

FIG. 3 is a bottom view of the adjustment mechanism housing;

FIG. 4 is a top view of the adjustment mechanism slider member;

FIG. 5 is a back view of the adjustment mechanism housing;

FIG. 6 is a top view of the adjustment mechanism housing;

FIG. 7 is a bottom view of the adjustment mechanism locking member;

FIG. 8 is a side view of the adjustment mechanism and locking member; and

FIG. 9 is a front view of the adjustment mechanism slider member.

DESCRIPTION OF THE PREFERRED EMBODIMENT

Referring to the Figures wherein like numerals indicate like or corresponding parts throughout the several views, a motion transmitting remote control cable assembly is generally shown at 10.

The assembly 10 comprises a flexible motion transmitting core element 12, a conduit 14 slideably supporting the core element, and a core adjustment mechanism 16, 18, 20 disposed on one end of the core element 12 for adjusting the length of the core element. The core adjustment mechanism comprises a slider member generally indicated at 16 attached to the one end of the core element 12. The slider member 16 defines a space 17 partially enclosed within the slider member 16. The slider member 16 surrounds the core element 12. The slider member 16 includes a closed end and an open end. The core adjustment mechanism also comprises a housing generally indicated at 18 slideably supporting the slider member 16 as the slider for reciprocating relative to the housing 18 in response to movement of the core element 12. Locking means generally indicated at 20 is disposed on the housing 18 for moving between an unlocked position in which the slider member 16 may reciprocate freely within the housing 18 and a locked position in which the slider member is prevented from reciprocating relative to the housing 18. The core adjustment mechanism also includes a spring 22 having first and second ends, the spring 22 being disposed between the slider member 16 and the housing 18 for reacting with the closed end of the slider and biasing the slider member away from the housing and taking up slack in the core element 12. The spring 22 is disposed in the space 17 within the slider member 16. The assembly 10 is characterized by a spring tab 24 extending from the housing 18 into the space 17 and abutting the second end of the spring 22 so that the slider member 16 telescopes over the spring tab 24 as the spring 22 reacts between the closed end of the slider member and the spring tab.

Referring to FIGS. 4 and 9, the slider member 16 includes a bottom wall 26 and spaced apart first and second side walls 28, 30 extending away from the bottom wall 26 to define a trench 32. In other words, the bottom and side walls of the slider member 16 define a channel, a trough or an elongated slot having a "U" shaped cross section for receiving the spring 22. A back wall 34 extends away from the bottom wall 26 and between the side walls 28, 30 to essentially close one end of the slider member 16. These walls 26, 28, 30, 34 define the partially enclosed space 17. By "partially enclosed space" it is generally meant that the space 17 be accessible by the spring tab 24 in a manner that the tab can abut the spring 22 and slide relative to the slider member 16 in a slit or slot in the slider member. There are various beneficial designs whereby the slider member 16 slides over or under the tab 24 as the slider member slides past the point where the tab attaches to the housing 18.

The first end of the spring 22 abuts the back wall 34. The spring 22 sits in the trench 32 or channel so that the spring and the trench have parallel axes. In other words, the axis through the spring 22 and the axis through the trench 32 are parallel.

The spring tab 24 defines a hole 36 so that the core element 12 extends through the hole 36 and attaches to the slider member 16. Thus, the spring tab 24 guides the core element 12 centrally through the spring and thereby prevents the core element from contacting the spring 22. The spring tab 24 protrudes from the housing 18 into the partially enclosed space 17 to abut the spring 22. The spring tab 24 in this case is rounded to have a "U" shape. This shape corresponds closely to the "U" shaped walls, i.e. the trench, of the slider member 16. The tab 24 could assume a variety of shapes.

Likewise, the slider member 16 could be shaped in a number of ways to partially enclose the spring 22 and at the same time provide clearance for the tab 24 to extend into the space 17 to abut the spring 22: the slider member 16 need not be "U" shaped as disclosed herein. In the present case, it is preferred that the space 17 be trench-like so that the slider member 16 defines a straight slit or slot into which the spring tab 24 may extend. With this arrangement, the housing 18 can be very small relative to the slider member 16, enclosing only a portion of the slider member; or it can enclose the entire slider member 16. Thus, this arrangement provides significant design flexibility in terms of the size and shape of the housing 18. In the present case the housing 18 does not completely enclose the slider member 16: it is open at opposite ends so that one or both ends of the slider member 16 can extend out of the housing 18.

The slider member 16 includes a spring cover wall 38 extending from the back wall 34 partially along the slider member 16 opposite the spring 22 from the bottom wall 26 whereby the spring is partially enclosed by the spring cover wall 38, the bottom wall 26 and the side walls of the slider member 16. The spring cover wall 38 covers or closes the trench 32 along a portion of the slider member 16 adjacent the back wall 34. Because the spring 22 abuts the back wall 34 of the slider member 16, the back wall 34 of the slider member is biased out of the housing 18. In the absence of the spring cover wall 38, the spring 22 would be exposed when this end of the slider member 16 extends out of the housing 18. The spring cover wall 38 is only long enough, or, said another way, extends only far enough away from the back wall 34, to ensure that the spring 22 will be covered. If the spring cover wall 38 extended any further than it does, it would limit the reciprocating movement of the slider member 16 because it would shorten the track or slot or trench 32 in which the spring tab 24 slides.

The core element 12 extends through the spring 22 within the coils of the spring, through the slider member 16 and attaches to the back wall 34 of the slider member. The core element 12 actually passes through a hole 40 in the back wall 34, and has a slug or other enlargement 42 crimped on its end to prevent the core element 12 from being pulled back through the hole 40 in the back wall 34.

The first and second side walls 28, 30 of the slider member 16 each include an inside surface facing the other of the side walls and an outside surface. The side walls each include locking teeth 44 disposed on their outside surfaces. The locking teeth 44 are a row of locking teeth extending perpendicular to the movement of the slider member 16. The locking teeth 44 each include an angled surface 46 facing back toward the back wall 34. The teeth 44 also include a normal surface 48 extending away from the outside surface normal to the outside surface. Looking at the teeth 44 from the top or bottom of the slider member 16, the teeth 44 appear to be a series of right triangles extending from the outside surface. In other words the locking teeth 44 slant away from the back wall 34. Each of the teeth 44 also define a slanted or chamfered surface 45 as best shown in FIGS. 1 and 2.

The locking teeth 68 on the locking means 20 are angled as shown in the Figures to mate with the teeth 44. The teeth 68 also define an angled or chamfered surface 69 as best shown in FIGS. 1 and 2.

Because it is undesirable for the core element 12 to be placed in tension in some applications, e.g. when the core element is a cruise control core element, something must be done to prevent this. Several design features ensure that the slider member 16 will never shift forward when the slider member teeth 44 engage the teeth 68 on the locking means 20. These features include the chamfered surfaces 45 on the locking teeth 44, the chamfered surfaces 69 on the locking teeth 68, the angling of the locking teeth 44 and the corresponding angling of the locking teeth 68. Thus, the slider member 16 will only stay in the same place or slide back relative to the housing 18, placing the core element 12 in a slightly slack or compressed disposition.

Also, the teeth 44, 68 can resist a greater load applied in one direction along the core element 12. This is because flat faces on the respective teeth 44, 68 abut one another in planes which are normal to the direction of the load.

The housing 18 includes first and second side walls 52, 54 parallel to the side walls 28, 30 of the slider member 16. The side walls 52, 54 include inside surfaces facing the locking teeth 44 on the slider member 16. The inside surfaces of the side walls of the housing 18 each include locking teeth 50 spaced apart from the locking teeth 44 on the slider member 16 to define a locking member space 56. In other words, the inside wall of the housing 18 is spaced apart from the slider member 16 to make room for the locking means 20. The teeth 50 are angled as shown in the Figures to provide maximum resistance to an axial load applied along the core element 12.

The housing 18 defines a locking passage 58 through the housing 18 transverse to the direction of reciprocating movement of the slider member 16. The locking passage 58 is an opening in the top of the housing 18. The locking means 20 includes a locking member having a top wall 60 and first and second spaced apart side walls 62, 64 extending down from the top wall so that the top wall and the side walls define a slot, "U" shaped in cross section, large enough to receive the slider member 16. The locking member 20 is sized to fit through the locking passage 58 so that the walls 62, 64 or legs of the locking member fit in the locking member space 56 and at the same time straddle the slider member 16. When the locking member 20 is in the locked position, the top wall of the locking member 20 is flush with the top side of the housing 18.

The top wall 60 of the locking member 20 includes notches 66 on the outer edge of the top wall for releasing the locking member 20 from the locking position. As has been said, when the locking member 20 is in the locking position the top wall 60 is flush with the top of the housing 18. The notches enable one to insert a screw driver blade or similar tool between the top wall 60 of the locking member 20 and the housing 18 to pop the locking member out of the locking position.

The side walls 62, 64 or legs of the locking member 20 each include an inside surface facing the other of the walls and an oppositely disposed outside surface. The walls 62, 64 each include locking teeth 68, 70 disposed on the inside and the outside surfaces so that the locking teeth 68 on the inside surfaces engage the locking teeth 44 on the slider member 16 and the locking teeth 70 on the outside surfaces engage the locking teeth 50 on the housing 18 when the locking member 20 is in the locking position and the side walls of the locking member 20 are disposed in the locking member space 56. The locking teeth 70 are angled, like the teeth 50, to resist loads applied in one direction along the core element 12.

The side walls 62, 64 of the locking member 20 each include spaced apart front and rear surfaces 72, 74. The front surface 72 of each wall 62, 64 includes a lower notch 76 and an upper notch 78. The rear surface 74 of each wall also includes a lower notch 76' and an upper notch 78'.

The housing 18 includes first and second bridge members 80 extending across the locking passage 58 in spaced apart and parallel fashion. The bridge members 80 each include two spaced apart bridge tabs 82 disposed thereon facing the other of the bridge members whereby the bridge tabs 82 engage the lower notches 76, 76' when the locking member 20 is in the unlocked position and engage the upper notches 78, 78' when the locking member 20 is in the locked position. The bridge tabs 82 protrude from the bridge members 80 into the notches 76, 76', 78, 78' of the locking member 20 to retain the locking member in one of its locked and unlocked positions. One can move the locking member 20 from one of these positions to the other of these positions by exerting a force sufficient to deflect the bridge 80 members out and to cause the bridge tabs 82 to pop out of engagement with whatever notch 76, 76', 78, 78' they were engaging.

The assembly 10 includes retaining means 84 for retaining the slider member 16 within the housing 18. The retaining means 84 comprises first and second spaced apart projections 86, 88 projecting outwardly from each of the side walls of the slider member 16. The projections 86, 88 project from the slider member 16 on both ends of the rows of locking teeth 44. The first projections 86 on either side of the slider member 16 abut the front surface 72 of the locking member 20 when the slider member 16 moves a predetermined distance with respect to the housing 18, and the second projections 88 abut the rear surface of the locking member 20 when the slider member 16 moves a predetermined distance in the opposite direction whereby the slider member 16 is prohibited from sliding out of the housing 18 at either end of the housing. The projections 86, 88 do not abut the housing 18 itself.

The assembly 10 also includes guide means 92, 94 for guiding the slider member 16 as the slider member reciprocates within the housing 18. The guide means 92, 94 includes first and second spaced apart guide channels 92 extending through the housing 18. These channels 92 are essentially parallel tracks or grooves along the bottom of the inside of the housing 18. The guide means 92, 94 also includes first and second spaced apart guide tabs 94 extending from the slider member 16 into the guide channels 92 for guiding the slider member along the guide channels. The guide tabs 94 are elongated to extend the entire length of the slider member 16. The guide tabs 94 are actually the ends of the side walls of the slider member 16. Thus, it can be said that the side walls 28, 30 fit in and slide along the channels.

The assembly 10 also includes securing means 96 for securing the housing 18 to a support structure (not shown). The support structure is in this situation an element on or near the transmission which is controlled by the core element push-pull assembly 10. The securing means 96 includes a "C" clip disposed on the bottom or under side of the housing 18.

Finally, the invention includes locking tangs 98, 100 extending from an end of the slider member 16. These tangs retain the slider member in the housing 18 during shipping. The tangs 98, 100 will keep the housing 18 and the slider 16 from separating even if the locking means 20 does not engage the slider 16 to retain it in the housing 18.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A motion transmitting remote control cable assembly (10) for transmitting motion in a curved path comprising:

a flexible motion transmitting core element (12);

a conduit (14) slideably supporting said core element (12);

an elongated slider member (16) attached to one end of said core element (12) and defining a space (17) surrounding said core element (12) with a closed end and an open end, said slider member (16) being "U" shaped in cross section with a bottom wall (26) joining first and second side walls (28, 30) to define said space (17) within said "U" shaped cross section, said closed end of said slider member (16) being defined by a back wall (34);

a housing (18) slideably supporting said slider member (16) for reciprocating movement relative to said housing (18);

locking means (20) supported by said housing (18) for moving between an unlocked position in which said slider member (16) may reciprocate freely within said housing (18) and a locked position in which said slider member is prevented from reciprocating relative to said housing;

a spring (22) having first and second ends and disposed at least partially in said space (17) within said slider member (16) to react against said Rack wall (34);

characterized by a spring tab (24) extending from said housing and abutting said second end of said spring (22) so that said slider member (16) travels over said spring tab (24) as said spring (22) reacts between said back wall (34) of said slider member (16) and said spring tab (24), with said spring tab (24) adapted to recess within said space (17) of said "U" shaped slider member (16) to increase the range of reciprocating movement between said slider member (16) and said housing (18) while maintaining a relatively compact assembly.

2. An assembly (10) as set forth in claim 1 further characterized by said spring tab (24) defining a hole (36), said core element (12) extending through said hole and being attached to said slider member (16).

3. An assembly (10) as set forth in claim 2 further characterized by said core element (12) extending through said spring (22), through said slider member (16) and being attached to said closed end (34) of said slider member.

4. An assembly (10) as set forth in claim 3 further characterized by said slider member (16) including a spring cover wall (38) extending from said back wall (34) partially along said slider member (16).

5. An assembly (10) as set forth in claim 4 further characterized by said first and second side walls (28, 30) of said slider member (16) each including an inside surface facing the other of said side walls and an outside surface, said side walls each including locking teeth (44) disposed on said outside surfaces.

6. An assembly (10) as set forth in claim 5 further characterized by said locking teeth (44) each including an angled surface (46) facing back toward said back wall (34).

7. An assembly (10) as set forth in claim 5 further characterized by said housing (18) including first and second side walls (52, 54) parallel to said side walls (28, 30) of said slider member (16), said side walls of said housing (18) including inside surfaces facing said locking teeth (44) on said slider member, said inside surfaces of said side walls of said housing (18) including locking teeth (50) spaced apart from said locking teeth on said slider member (16) to define a locking member space (56).

8. An assembly (10) as set forth in claim 7 further characterized by said housing (18), including a transverse locking passage (58), said locking means (20) including a locking member including a top wall (60) and first and second spaced apart side walls (62, 64) extending down from said top wall so that said top wall and said side walls of said locking member define a "U" shaped slot in cross section to receive said slider member (16), said locking member (20) fitting through said locking passage (58).

9. An assembly (10) as set forth in claim 8 further characterized by said side walls (62, 64) of said locking member (20) each including an inside surface facing the other of said side walls and an oppositely disposed outside surface, said side walls (62, 64) of said locking member (20) each including locking teeth (68, 70) disposed on said inside and said outside surfaces so that said locking teeth (68) on said inside surfaces of said locking member (20) engage said locking teeth (44) on said slider member (16) and said locking teeth (70) on said outside surfaces of said locking member (20) engage said locking teeth (50) on said housing (18) when said locking member (20) is in said locked position and said side walls (62, 62) of said locking member are disposed in said locking member space (56).

10. An assembly (10) as set forth in claim 9 further characterized by said side walls (62, 64) of said locking member (20) each including spaced apart front and rear surfaces (72, 74), said front surface (72) of each side wall including a lower notch (76) and an upper notch (78), said rear surface (74) of each side wall also including a lower notch (76') and an upper notch (78').

11. An assembly (10) as set forth in claim 10 further characterized by said housing (18) including first and second bridge members (80) extending across said locking passage (58) in spaced apart and parallel fashion, said bridge members (80) each including two spaced apart bridge tabs (82) disposed thereon facing the other of said bridge members whereby said bridge tabs (82) engage said lower notches (76, 76') when said locking member (20) is in said unlocked position and engage said upper notches (78, 78') when said locking member (20) is in said locked position.

12. An assembly (10) as set forth in claim 11 further characterized by including retaining means (84) for retaining said slider member (16) within said housing (18).

13. An assembly (10) as set forth in claim 12 further characterized by said retaining means (84) comprising first and second spaced apart projections (86, 88) projecting outwardly from each of said side walls (28, 30) of said slider member (16), said projections (86, 88) abutting one of said front and rear surfaces (72, 74) of said locking member (20) when said slider member (16) moves a predetermined distance with respect to said housing (18) whereby said slider member (16) is prohibited from sliding out of said housing.

14. An assembly (10) as set forth in claim 13 further characterized by including guide means (92, 94) for guiding said slider member ( 16 ) as said slider member reciprocates within said housing (18).

15. An assembly (10) as set forth in claim 14 further characterized by said guide means (92, 94) including first and second spaced apart guide channels (92) extending through said housing (18).

16. An assembly (10) as set forth in claim 15 further characterized by said guide means (92, 94) including first and second spaced apart guide tabs (94) extending from said slider member (16) into said guide channels (92) for guiding said slider member along said guide channels.

17. An assembly (10) as set forth in claim 16 further characterized by including securing means (96) for securing said housing (18) to a support structure.

18. An assembly (10) as set forth in claim 17 further characterized by said securing means (96) including a "C" clip disposed on said housing (18).

* * * * *